United States Patent
Sánchez Charles et al.

(10) Patent No.: US 10,217,054 B2
(45) Date of Patent: Feb. 26, 2019

(54) ESCALATION PREDICTION BASED ON TIMED STATE MACHINES

(71) Applicant: CA, Inc., New York, NY (US)

(72) Inventors: David Sánchez Charles, Barcelona (ES); Victor Muntés Mulero, Barcelona (ES)

(73) Assignee: CA, Inc., New York, NY (US)

( * ) Notice: Subject to any disclaimer, the term of this patent is extended or adjusted under 35 U.S.C. 154(b) by 368 days.

(21) Appl. No.: 15/070,547

(22) Filed: Mar. 15, 2016

(65) Prior Publication Data

US 2017/0270419 A1    Sep. 21, 2017

(51) Int. Cl.
  *G06F 17/30* (2006.01)
  *G06N 7/00* (2006.01)
  *G06Q 10/06* (2012.01)

(52) U.S. Cl.
  CPC ......... *G06N 7/005* (2013.01); *G06F 17/3053* (2013.01); *G06F 17/30864* (2013.01); *G06F 17/30011* (2013.01); *G06F 17/3071* (2013.01); *G06F 17/30705* (2013.01); *G06F 17/30707* (2013.01); *G06Q 10/06* (2013.01)

(58) Field of Classification Search
  CPC ...... G06Q 30/016; G06Q 10/06; G06Q 10/20; G06Q 10/00; G06Q 10/0635; G06Q 10/10; G06F 17/30011; G06F 17/3053; G06F 17/30705; G06F 17/3071; G06N 7/005
  USPC ........ 707/725, 737, 749, 752, 758; 705/304; 705/7.28; 706/25, 52
  See application file for complete search history.

(56) References Cited

U.S. PATENT DOCUMENTS

| | | | |
|---|---|---|---|
| 7,607,046 B1 | 10/2009 | Bruckhaus | |
| 9,172,809 B1* | 10/2015 | Mockus | H04M 3/5235 |
| 9,785,690 B2* | 10/2017 | Bandera | G06F 3/04842 |
| 2011/0270770 A1* | 11/2011 | Cunningham | G06Q 10/10 |
| | | | 705/304 |
| 2012/0226518 A1* | 9/2012 | Haddad | G06Q 10/06 |
| | | | 705/7.28 |
| 2015/0347906 A1* | 12/2015 | Bodda | G06Q 10/20 |
| | | | 706/52 |

(Continued)

OTHER PUBLICATIONS

W. M. P. van der Aalst, M. H. Schonenberg, and M. Song. 2011. *Time prediction based on process mining.* Inf. Syst. 36, 2 (Apr. 2011), 450-475.

(Continued)

*Primary Examiner* — Dangelino N Gortayo
(74) *Attorney, Agent, or Firm* — Sage Patent Group

(57) ABSTRACT

In a computer server, a ticket element generated by an issue tracking system responsive to a client request is received, where the ticket element includes a data field including data indicative of an attribute. A database including state data stored therein is accessed responsive to receipt of the ticket element. The state data relates a plurality of states that are specific to the attribute. One of the plurality of states related by the state data is identified as corresponding to a future state of the attribute based on a current state of the attribute, and a future probability of escalation of the ticket element is computed based on the future state of the attribute responsive to identification of the one of the plurality of states as corresponding thereto. An action indicator is provided in response to the client request.

20 Claims, 7 Drawing Sheets

(56) References Cited

U.S. PATENT DOCUMENTS

2016/0224910 A1* 8/2016 Deng ............... G06Q 10/0633
2017/0116616 A1* 4/2017 Donatelli ............ G06Q 30/016

OTHER PUBLICATIONS

Feliz Salfner, M. Malek. Using Hidden Semi-Markov Models for Effective Online Failure Prediction. In the 26th IEEE International Symposium on Reliable Distributed Systems, 2007. SRDS 2007.

Hamid Reza Motahari-Nezhad and Claudio Bartolini. 2011. *Next best step and expert recommendation for collaborative processes in it service management*. In Proceedings of the 9th international conference on Business process management (BPM'11).

R. P. Jagadeesh Chandra Bose and Wil M. P. van der Aalst. 2010. *Trace alignment in process mining: opportunities for process diagnostics*. In Proceedings of the 8th international conference on Business process management (BPM'10).

Sreerama K. Murthy. *Automatic Construction of Decision Trees from Data: A Multi-Disciplinary Survey*. In Data Mining and Knowledge Discovery, Dec. 1998, vol. 2, Issue 4, pp. 345-389.

* cited by examiner

ESCALATION PREDICTION BASED ON TIMED STATE MACHINES

FIELD

The present invention relates generally to electrical computers and digital processing systems, and more particularly, to interprogram communication.

BACKGROUND

Online support centers may operate based on an asynchronous communication between customers and support engineers. Online collaborative tools for IT (information technology) support, such as JIRA Service Desk or other service desk management systems, can allow customers to remotely communicate with support engineers via a web portal. A customer with a malfunctioning service or product can initiate the communication with the support team by creating a new 'issue' in the system (also referred to herein as a 'ticket' or 'case'). The issue tracking computer system can assign the ticket to any available support engineer, and the communications between customer and the support engineer can initiate to find a solution to the problem.

Tickets may refer to data structures that include a description of the issue, details as to who opened the ticket (e.g., customer and contact details), and/or the severity of the issue with respect to damage to the customer business. Updates may be performed in text format, for example, by e-mail, and may be registered by the system for later analysis. In some instances, customers and support engineers can schedule a remote session to look at the issue in customer environment. Documents such as logs or screenshots can be uploaded with each ticket update. An issue may be considered resolved upon explicit customer approval, or upon absence of further customer updates within a defined period of time. Such support services may entail several benefits for the service provider or the software/product vendor, as the number of required engineers may be lower than those required by assisting customers through direct phone calls. Unfortunately, customer satisfaction may be reduced due to the slower and potentially more inefficient support process.

In order to avoid customer dissatisfaction, more resources and/or higher priority may be allocated based on the severity and/or urgency of the issues. For example, some systems may rely on a self-assessment survey sent to customers at ticket creation, and/or on the expertise of support engineers to identify the severity and/or urgency of issues. To detect customer dissatisfaction earlier, support services may implement a process to let customers warn the support engineers that a ticket is taking too long to solve and it is affecting their business, referred to as escalation. Customers can thus 'escalate' issues if they feel the support engineers may be underestimating the severity and/or if the speed of response may be negatively affecting their business. Supervision of escalated tickets may be increased, and more resources may be devoted to resolution. The number of escalations may thus be an indicator of customer dissatisfaction with the service and/or a key performance indicator (KPI) used in companies to understand the level of quality of the customer support team.

SUMMARY

Some embodiments described herein are directed to a computer server including a processor and a memory coupled to the processor. The memory includes a computer-readable storage medium storing computer-readable program code therein that is executable by the processor to perform operations including receiving a ticket element from or generated by an issue tracking system responsive to a client request. The ticket element includes a data field having data therein indicative of an attribute. The operations further include accessing a database including state data stored therein responsive to receipt of the ticket element. The state data includes and relates a plurality of states that are specific to the attribute indicated by the data field of the ticket element. The operations further include identifying one of the plurality of states related by the state data as corresponding to a future state of the attribute based on a current state of the attribute, and computing a future probability of escalation of the ticket element based on the future state of the attribute responsive to identification of the one of the plurality of states of the state data as corresponding thereto. The operations further include providing an action indicator in response to the client request. The action indicator is based on the future probability of escalation of the ticket element relative to a predefined threshold.

Some embodiments described herein are directed to a method performed by a processor of a computer server. The method includes accessing a database including state data stored therein. The state data includes and relates a plurality of states that are specific to a time-dependent attribute that is indicated by data in a data field of a ticket element, where the ticket element is received from or generated by an issue tracking system responsive to a client request. The method further includes identifying ones of the plurality of states related by the state data as corresponding to current and future states of the time-dependent attribute, where the future state of the attribute corresponds to a future time after a current time corresponding to the current state. The method further includes computing a probability of escalation of the ticket element with respect to the future time based on the current state and the future state of the time-dependent attribute responsive to identification of the ones of the plurality of states of the state data as corresponding thereto, and providing an action indicator in response to the client request based on the probability of escalation of the ticket element with respect to the future time relative to a predefined threshold.

Some embodiments described herein are directed to a computer program product including a non-transitory computer-readable storage medium having computer-readable program code embodied therein. The computer-readable program code is executable by a processor of a computer server to perform operations including receiving a ticket element from or generated by an issue tracking system responsive to a client request, where the ticket element includes a data field having data therein indicative of an attribute, and accessing a database including state data stored therein responsive to receipt of the ticket element. The state data includes and relates a plurality of states that are specific to the attribute indicated by the data field of the ticket element. The operations further include identifying one of the plurality of states related by the state data as corresponding to a future state of the attribute based on a current state of the attribute, computing a future probability of escalation of the ticket element based on the future state of the attribute responsive to identification of the one of the plurality of states as corresponding thereto, and providing an action indicator in response to the client request. The action indicator is based on the future probability of escalation of the ticket element relative to a predefined threshold.

Other methods, computer servers, and computer program products according to embodiments will be or become apparent to one with skill in the art upon review of the following drawings and detailed description. It is intended that all such additional methods, computer servers, and computer program products, including any and all combinations of operations performed thereby, be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
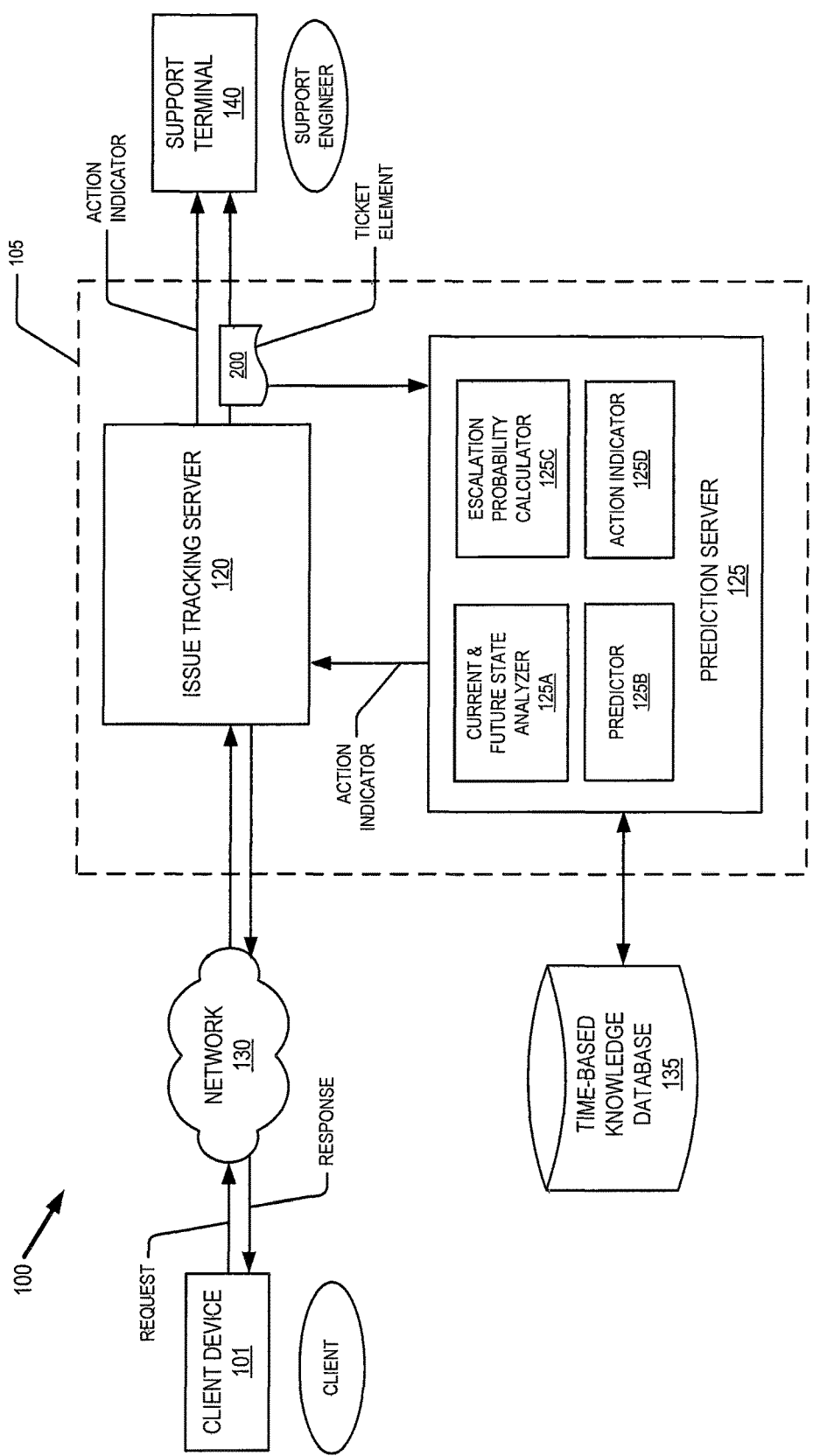
FIG. 1 is a block diagram illustrating components of a computer system in accordance with some embodiments.

Various embodiments will be described more fully hereinafter with reference to the accompanying drawings. Other embodiments may take many different forms and should not be construed as limited to the embodiments set forth herein. Like numbers refer to like elements throughout.

As described herein, a computer server may include a computer or cluster of computers. For example, the computer server can be a large mainframe, a minicomputer cluster, or a group of servers functioning as a unit. In one example, the computer server may be coupled to a Web server. The computer server may be coupled to a database and may include hardware (including one or more processors, memory, etc.), software, or combinations thereof for servicing the requests from one or more client computers. The computer server may include one or more computational apparatuses and may use any of a variety of computing structures, arrangements, and compilations for servicing the requests from one or more client computers.

An issue tracking system (ITS) may refer to a computer program product, executing on one or more computer servers, that manages and maintains lists of issues experienced by customers, for example, with respect to an actual or perceived malfunction of a service or product. Issue tracking systems may be used to create, update, and resolve issues reported by customers and/or employees (generally referred to herein as clients) with respect to the service or process. An issue tracking system may contain a knowledge database, stored in a computer-readable storage medium, containing information about clients, previous problems and resolutions, and other such historical data.

A support ticket or trouble ticket within an issue tracking system (generally referred to herein as a ticket element) may refer to a data structure containing data fields indicative of a particular client issue, its status, and/or other relevant data. Attributes of a ticket element that may be indicated by the data fields may include evolving or time-dependent attributes (for example, ticket status (opened/closed/pending), severity state, urgency state, time since creation), and time-independent attributes (for example, client identifier, time of opening, internal system identifier). The internal system identifier may be a unique reference number, also known as a case, issue, or call log number, which can be used by the system to locate, update, and/or verify the status of issue or request. A ticket element may thus include information for the account involved and the issue encountered as may be relevant to resolution of the issue. Other relevant attributes may be based on a context of the ticket element, such as the number of tickets opened by a particular customer, how many times the ticket has had a particular status, and the number of tickets currently open or unresolved in the issue tracking system, which may not be included in or otherwise evident from the data fields of a particular ticket element. A ticket element for an issue that is not being or has not been resolved to the client's satisfaction can brought to the attention of the support engineer(s) and/or a more senior member or manager of the client support team, in a process referred to herein as escalation of the ticket element.

Some embodiments described herein provide computer systems and methods to predict the escalation of ticket elements by computing a probability of escalation using timed state graphs or state transition tables (generally referred to herein as state data) to model characteristics or attributes of a ticket that are expected to change over time. Such time-dependent attributes may be indicated by the ticket element itself (e.g., opened, pending, or closed), and/or may be contextual (e.g., ticket impact with respect to the client's business or the client relationship with the support team). Embodiments described herein can thus predict escalations for a particular client in advance of a predefined future time, with sufficient remaining time for the support team to improve the client experience before the escalation occurs.

FIG. 1 is a block diagram illustrating components of a computer system or environment 100 in accordance with some embodiments. Referring now to FIG. 1, the computer system 100 includes a client computing device 101 and an issue tracking system 105 communicatively coupled by a network 130. The issue tracking system 105 includes an issue tracking server 120 and a prediction server 125, which provide communication between the client device 101 and one or more computing terminals 140 of a support service for issue resolution by one or more support engineers. In particular, upon encountering a problem or issue with a software- and/or hardware-based product or service, the client can generate a request to the support service via the client device 101, and transmit the request to the support service via the network 130. The issue tracking server 120 may generate (or "open") a ticket element 200 indicative of the client issue responsive to the request, and may provide the ticket element 200 to the support service via support terminal 140. One or more support engineers may thereby be assigned to resolve the client issue indicated by the ticket element 200 in response to client request.

The issue tracking server 120 may also provide the ticket element 200 to the prediction server 125. The prediction server 125 is a computing device that includes hardware and/or software subsystems 125A-125D that are configured to estimate a likelihood or probability of escalation of the ticket element 200 at a future time. For example, the prediction server 125 may include an attribute-based current and future state analyzer 125A, state-based predictor(s) 125B, a future escalation probability calculator 125C, and an action indicator 125D. The prediction server 125 is communicatively coupled to and is configured to access a time-based knowledge database 135, which includes attribute-specific state models (for example, state diagrams and/or state graphs relating the possible states of the attribute and transitions therebetween) and state-specific predictive models.

In particular, the current and future state analyzer 125a is configured to access the state data stored in the time-based knowledge database 135, and is configured to identify particular states that correspond to a current state (at a current time s) and one or more possible future states (at a desired or predefined future time t) of one or more attributes indicated by respective data fields of the ticket elements 200. The predictor(s) 125B are configured to select and apply corresponding predictive models stored in the time-based knowledge database 135 for the current and future states, and is configured to calculate or compute respective probabilities of escalation for the current and future states. The future escalation probability calculator 125C is configured to combine the respective probabilities of escalation, in some embodiments based on respective likelihoods of occurrence of the future state(s) at the future time t, to calculate or compute the probability of escalation of the ticket element at the future time t, i.e., the future probability of escalation. The action indicator 125D is configured to determine, based on the future probability of escalation relative to a predefined threshold and/or based on a remaining amount of time until the future time t, appropriate action(s) that may be taken by the support service to prevent the escalation and/or reduce the future probability of escalation of the ticket element.

Embodiments described herein thus define computer program products, servers, and methods for predicting the likelihood of a ticket element 200 being escalated, based on its attribute(s) at the current time, and based on its expected evolution by some future time t, by considering changes in the states of time-dependent attributes of the ticket element 200. Embodiments described herein access timed automata that models one or more properties or attributes of the ticket, where each particular state in the automata is coupled with a predictor targeted to ticket elements that, at some point, are in that particular state. Examples of attributes of a ticket element 200 may include (but are not limited to) a status that is specified by the customer support engineer (e.g., Opened, Pending Fix, Closed), severity, the number of tickets open for that particular customer, and/or the output of using complex methods to automatically extract relevant topics for a ticket or analyze the sentiment of a particular message or ticket. Several of these attributes may change over time, and are therefore referred to herein as time-dependent or 'evolving' attributes of a ticket due to their time-dependent nature.

Escalation prediction using timed automata as described herein may provide several benefits. For example, escalation prediction can be improved by computing specific probabilities for tickets in a particular situation (e.g. tickets collocated in a state of the state machine). Also, by considering timed states and transitions, the escalation prediction can take into account changes in the context over time. Embodiments described herein can also predict escalations at any specified time in the "life" of the ticket element (i.e., at any time between opening and closing of the ticket element). For example, escalation prediction can be computed after each interaction between a client and the support team, or even after some days have passed since the last ticket update. In both cases, embodiments described herein can be based on all ticket updates, time gaps between updates, and time since last update, improving the accuracy of the prediction escalation.

It will be appreciated that, in various embodiments described herein, the client computing device 101 may be a mobile phone (e.g., smart phone, cellular phone, etc.), tablet, portable media player, laptop computer, desktop computer, personal digital assistant (PDA), and/or wearable computing device (e.g., watch), or other electronic device. It will likewise be appreciated that, in various embodiments described herein, the issue tracking server 120 and the prediction server 125 may be implemented as a single server, separate servers, or a network of servers (physical and/or virtual), which may be co-located in a server farm or located in different geographic regions. Various elements of the network 130 may be part of a local, wide area, or global network, such as the Internet or other publicly accessible network, and/or may be part of an Intranet and/or other private network, which may not be accessible by the nodes of the network 130B. The network 130 may include wireless and/or wireline networks. More generally, although FIG. 1 illustrates an example of a computing system or environment 100, it will be understood that embodiments described herein are not limited to such a specific configuration, but are intended to encompass any configuration capable of carrying out the operations described herein.

As described in greater detail herein, embodiments of the present disclosure can estimate the likelihood or probability of a ticket being escalated in its current state (also referred to herein as a current probability of escalation), and how this likelihood or probability is expected to evolve over time. In particular embodiments, current state of an attribute of a received ticket element is related to at least one state in a state graph, such that the escalation prediction is performed taking into account previous ticket elements in the same situation or state. The escalation prediction may also consider attributes that are not modeled in the state graph, such as other ticket elements generated responsive to requests by the same client and/or the total number of pending ticket elements in the issue tracking system. In addition, timed/temporal information in the state graph can allow a state-specific predictor to foresee, and take into account, future changes with respect to the state(s) of the ticket attributes.

Decision trees may be used to solve the problem of classifying ticket elements (e.g., 'escalated' or 'non-escalated'). A decision tree may be designed such that each node classifies ticket elements in two subcategories. The combination of these different subcategories may be well-aligned with the attribute to be predicted. However, attributes that can change over time may not be well represented in decision trees. For example, a change in an evolving attribute might classify a ticket in a completely different subcategory, but the relation between those two subcategories may not be represented in the model. Also, decision trees (and/or other classification techniques) may not address classification problems with respect to sequential events.

Hidden Markov Chains (HMC) may be used for the classification problem of sequential events. In HMC, two layers of knowledge may be represented: a public layer with the events, and a hidden layer representing the possible categories. The HMC may capture changes or movements over the public layers, and may return the likelihood of the sequence being valid for the model. The classification problem ('escalated' or 'non-escalated') may thus be addressed by considering a HMC for each category. However, HMC may not take into account the timing of the events, or the evolution of a prediction in the future. An extension of Hidden Markov Chains may consider the time between events. In a continuous-time Hidden Markov Chain (CTHMC), the probability of a transition may depend on the current state and the time since last state change. Nevertheless, CTHMC (and HMC in general) may not provide a mechanism to take into account non-modeled attributes in the computation of the probability of escalation.

One mechanism that may be used in escalation prediction may be the mapping of a current state of an issue to a state graph (which may be generated from historical data, for example through process mining techniques) to determine possible next action(s) in resolution of the issue. Embodiments described herein add escalations as a step in the issue resolution, to predict the escalation before it occurs. Embodiments described herein further add timing information to the model, and are thus able to predict an escalation with sufficient time in advance to take preventative action. Attributes not used in the state graph or model may not be considered in the escalation prediction.

Figure 2:
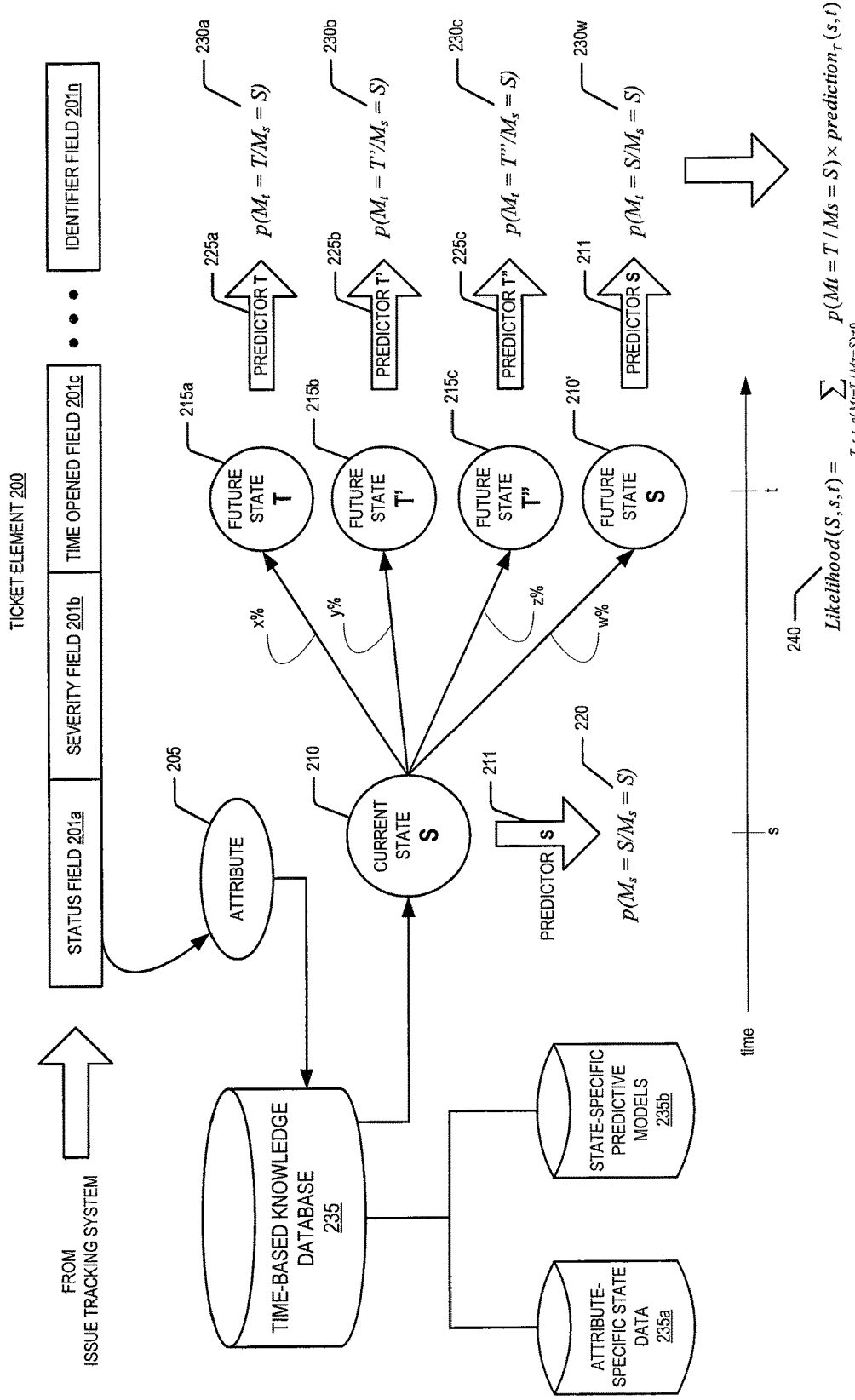
FIG. 2 is a flow diagram illustrating operations performed by various components of the computer system of FIG. 1 in accordance with some embodiments.

FIG. 2 is a flow diagram illustrating escalation prediction in accordance with some embodiments of the present disclosure. Referring now to FIG. 2, ticket element 200 is received from an issue tracking computer system, such as the issue tracking server 120 of FIG. 1. The ticket element 200 is a data structure including multiple data fields 201a . . . 201n, where one or more of the data fields 201a . . . 201n are indicative of attributes of the ticket element 200. In the example FIG. 2, the ticket element 200 includes a status field 201a, a severity field 201b, a time since creation (or elapsed time) field 201c, and an identifier field 201n. The data fields 201a, 201b, and 201c are indicative of time-dependent attributes of the ticket element 200, in that the states of the attributes indicated by these fields may change or evolve over time. In contrast, the data field 201n in the example of FIG. 2 is indicative of static attributes, such as an identifier of the client who opened the ticket element 200, a numerical identifier, and/or other identifier of the ticket element 200 for use by the issue tracking system.

Still referring to FIG. 2, one or more time-dependent attributes 205 indicated by the data fields 201a . . . 201n of the ticket elements 200 is used by embodiments described herein to compute or otherwise predict a probability or likelihood of escalation of the ticket element 200 at a future time t. The example of FIG. 2 is described herein with respect to the time dependent attribute 205 indicated by the status field 201a of the ticket element 200; however, it will be understood that other time-dependent attributes may be additionally or alternatively used for escalation prediction. Based on the time-dependent attribute 205 indicated by data field 201a of the ticket element 200, a time-based knowledge database 235 is accessed. The knowledge database 235 stores state data 235a that is specific to the attribute 205, and predictive models 235b that are specific to the possible states of the attribute 205. The state data 235a may be data structures including historical data, for example, as manually or automatically mined from previous ticket elements of the issue tracking system 105 and/or other issue tracking systems. The state data 235a may indicate a plurality of possible states that are specific to the attribute 205. In some embodiments, the state data 235a may be stored in the form of a state diagram or state graph that relates the possible states of the attribute 205, including transitions between the possible states, as described in greater detail herein.

As shown in FIG. 2, at least one of the states of the attribute-specific state data 235a is identified as a current state S 210 of the time-dependent attribute 205 indicated by the data field 201a of the ticket element 200. In addition, one or more of the states of the attribute specific state data 235a are identified as possible future states T 215a, T' 215b, T'' 215c, and S 210' of the time dependent attribute 205. The possible future states T 215a, T' 215b, T'' 215c, and S 210' are identified with respect to a future time t after a current time s corresponding to the current state S 210. For example, the attribute-specific state data 235a may also include temporal data indicating respective durations of time for or between each of the states of the state data 235a, and the possible future states T 215a, T' 215b, T'' 215c, and S 210' may be identified based on the durations of time indicated by the temporal data for the current state S 210 and/or states between the current state S 210 and the possible future states T 215a, T' 215b, T'' 215c, and S 210'. As shown in FIG. 2, one of the possible future states S 210' may be the current state S 210; that is, it is possible that the current state at time s may be maintained at the future time t.

Responsive to identification of the current state S 210 and the possible future states T 215a, T' 215b, T'' 215c, and S 210' with respect to the time t, respective ones of the state-specific predictive models 235b stored in the database 235 are retrieved and applied as predictors T 225a, T' 225b, T'' 225c, and S 211 to compute respective probabilities of escalation for each of the states T 215a, T' 215b, T'' 215c, and S 210, 210'. The predictors T 225a, T' 225b, T'' 225c, and S 211 may be trained with previous ticket elements in the situation defined by each of the states T 215a, T' 215b, T'' 215c, and S 210'. For example, the predictors T 225a, T' 225b, T'' 225c, and S 211 may be based on the percentage of escalated ticket elements out of all the ticket elements in a state in any moment in the past, or may be more sophisticated, such as being based on decision trees taking into account non-modelled attributes and/or neural networks. The state-specific predictive models 235b may thus be data structures that include historical escalation data, for example, as manually or automatically determined from previous ticket elements of the issue tracking system 105 and/or other issue tracking systems, which are specific to the situations defined by each of the states T 215a, T' 215b, T'' 215c, and S 210/210'. In particular, predictor S 211 is applied to the current state S 210 to compute an initial probability of escalation 220 with respect to the current time s, while predictors T 225a, T' 225b, T'' 225c, and S 211 are applied to the possible future states T 215a, T' 215b, T'' 215c, and S 210', respectively, to compute respective probabilities of escalation 230a, 230b, 230c, and 230w with respect to the future time t.

The respective probabilities of escalation 230a, 230b, 230c, and 230w are also weighted by respective likelihoods of occurrence x, y, z, and w of the future states T 215a, T' 215b, T'' 215c, and S 210' at the future time t. The likelihoods of occurrence x, y, z, and w of the future states T 215a, T' 215b, T'' 215c, and S 210' at the future time t may be determined from the attribute-specific state data 235a based on the current state S 210 of the attribute 205 at the current time s. For example, as described in detail below, the attribute-specific state data 235a for the attribute 205 may include probabilistic state data indicating respective likelihoods of occurrence of the states stored therein at respective times.

Still referring to FIG. 2, the initial probability of escalation 220 for the current time s and/or the respective probabilities of escalation 230a, 230b, 230c, and 230w for the future time t may be combined to compute a probability of escalation 240 of the ticket element 200 with respect to the future time t, also referred to herein as the future probability of escalation 240 of the ticket element 200. As such, the future probability of escalation 240 may represent an evolution of the initial probability of escalation 220 over the duration between current time s and future time t. For example, in some embodiments, the respective probabilities of escalation 230a, 230b, 230c, and 230w (as weighted by the respective likelihoods of occurrence x, y, z, and w of their corresponding possible future states T 215a, T' 215b, T" 215c, and S 210', respectively) and the initial probability of escalation 220 may be averaged to compute the future probability of escalation 240. Computation of the future probability of escalation 240 may also be based on additional factors, for example, one or more contextual attributes that are not indicated by or otherwise evident from a data structure of the ticket element 200. Such contextual attributes that may not be evident from the ticket element 200 may include a number of additional ticket elements currently associated with the same client, or a number of additional ticket elements currently pending in the issue tracking computer system.

Figure 3:
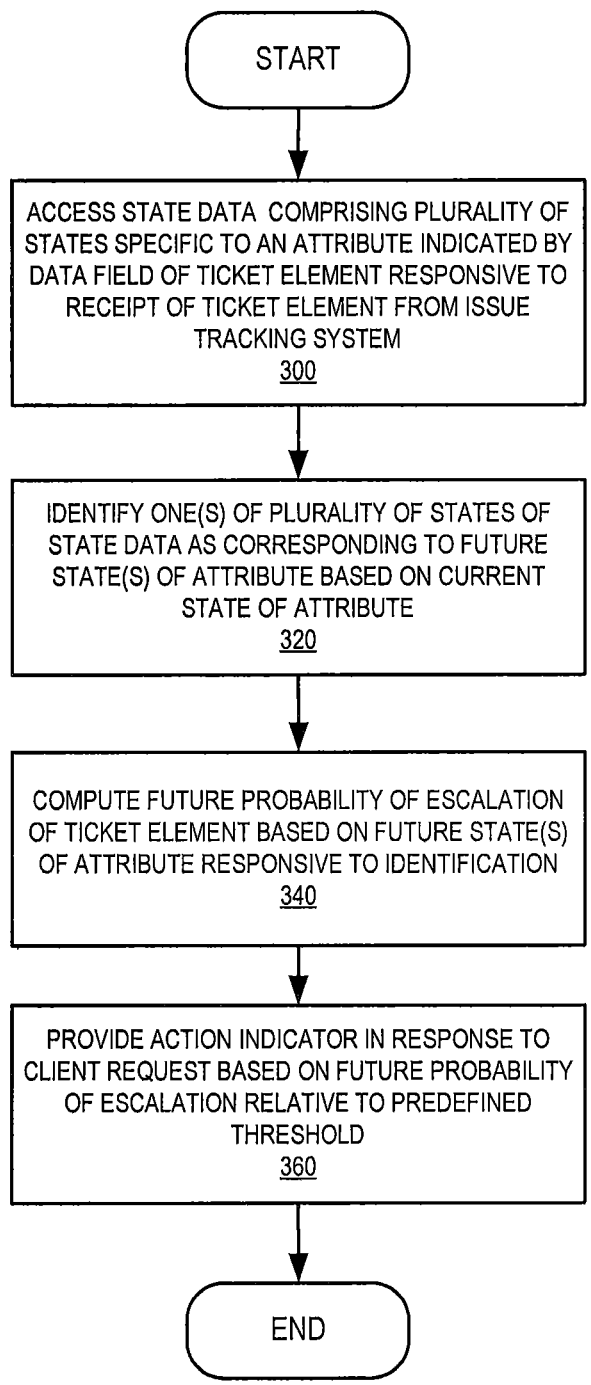
FIGS. 3 and 4 are flowcharts illustrating operations performed by various components of a computer system in accordance with some embodiments.

FIG. 3 is a flowchart illustrating the general operations shown in FIG. 2 for computing a future probability of escalation of a ticket element in accordance with some embodiments described herein. The operations of FIG. 3 may be performed by a processor of a computer server, such as the issue tracking server 120 and/or the prediction server 125 of FIG. 1. Referring now to FIG. 3, a database 235 including state data 235a stored therein is accessed responsive to receipt of a ticket element 200 from an issue tracking system at block 300. The state data 235a may include or may otherwise be used to derive a state graph and/or state diagram relating a plurality of states that are specific to an attribute 205 indicated by a data field 201a of the ticket element 200. At least one of the states of the stored state data 235a is identified as corresponding to at least one future state 215a-215c, 210' of the attribute 205 based on a current state 210 of the attribute 205 at block 320. For example, respective durations of or between the states included in the state data 235a may be used to identify one or more of the states of the state data 235a as possible future states 215a-215c, 210' of the attribute 205 with respect to a future time t after a current time s the current state 210 based on the relationships between the states 210 and 215a-215c, 210' indicated by the state graph and/or state diagram.

Still referring to FIG. 3, at block 340, a future probability of escalation 240 of the ticket element 200 is computed based on the future state(s) 215a-215c, 210' of the attribute 205 responsive to identification of state(s) of the state data 235a as corresponding thereto. For example, the future probability of escalation 240 may be computed from respective probabilities of escalation 230a, 230b, 230c, 230w for the possible future states 215a, 215b, 215c, 210' (as weighted by respective likelihoods of occurrence x, y, z, w thereof at the future time t), respectively, in combination with an initial probability of escalation 220 for the current state 210 (which may be independent of a time-based component). As noted above, the initial probability of escalation 220 for the current state 210 and the respective probabilities of escalation 230a, 230b, 230c, 230w for the possible future states 215a, 215b, 215c, 210' may be computed by accessing and applying respective predictive models 235b stored in the database 235 as state specific predictors 225a, 225b, 225c, and 211. In some embodiments, the initial probability of escalation 220 and the respective probabilities of escalation 230a, 230b, 230c, 230w (as weighted by the corresponding likelihoods of occurrence x, y, z, w) may be averaged to compute the future probability of escalation 240 of the ticket element 200.

At block 360, at least one action indicator is provided in response to the client request, based on the future probability of escalation 240 relative to a predefined threshold. For example, one or more actions (e.g., raising an alarm, increasing ticket priority, increasing resource allocation, etc.) may be determined to be helpful with respect to reducing or preventing ticket escalation when the future probability of escalation 240 of the ticket element 200 exceeds the defined threshold, and the action indicator(s) may be generated and provided based on the determined action(s). The threshold for action may be based on a desired risk tolerance, and/or may be based on historical ticket escalation data stored in the database 235. In some embodiments, the action(s) to be taken may also be determined based on the amount of time remaining between the current time s and the future time t, that is, the action may depend on how much time is left before the escalation of the ticket element 200 is predicted to occur. The escalation prediction operations discussed above with reference to FIGS. 2 and 3 are further described below with reference to the probabilistic state graphs shown in FIGS. 5 and 6.

Figure 5:
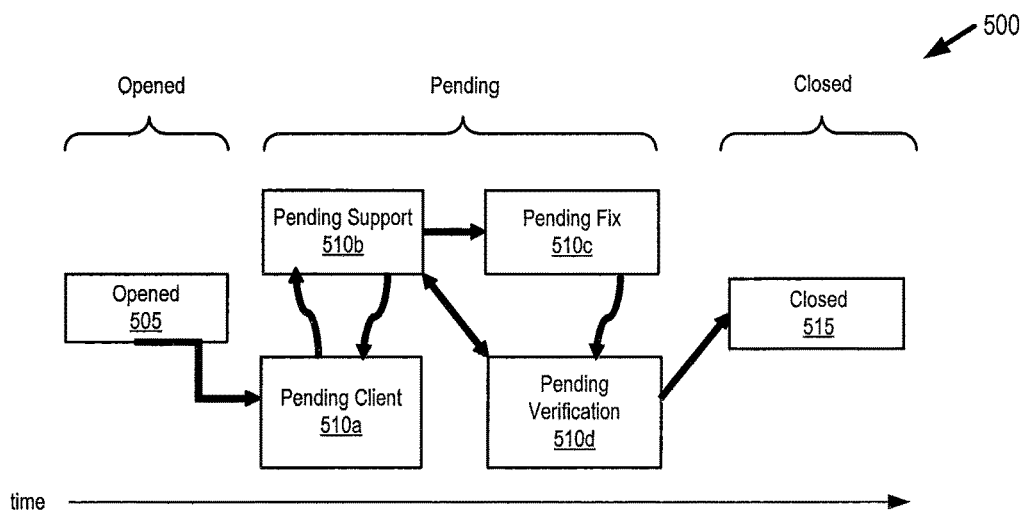
FIGS. 5, 6, and 7 are state graphs relating various possible states of attributes indicated by data fields of ticket elements in accordance with some embodiments.
Figure 6:
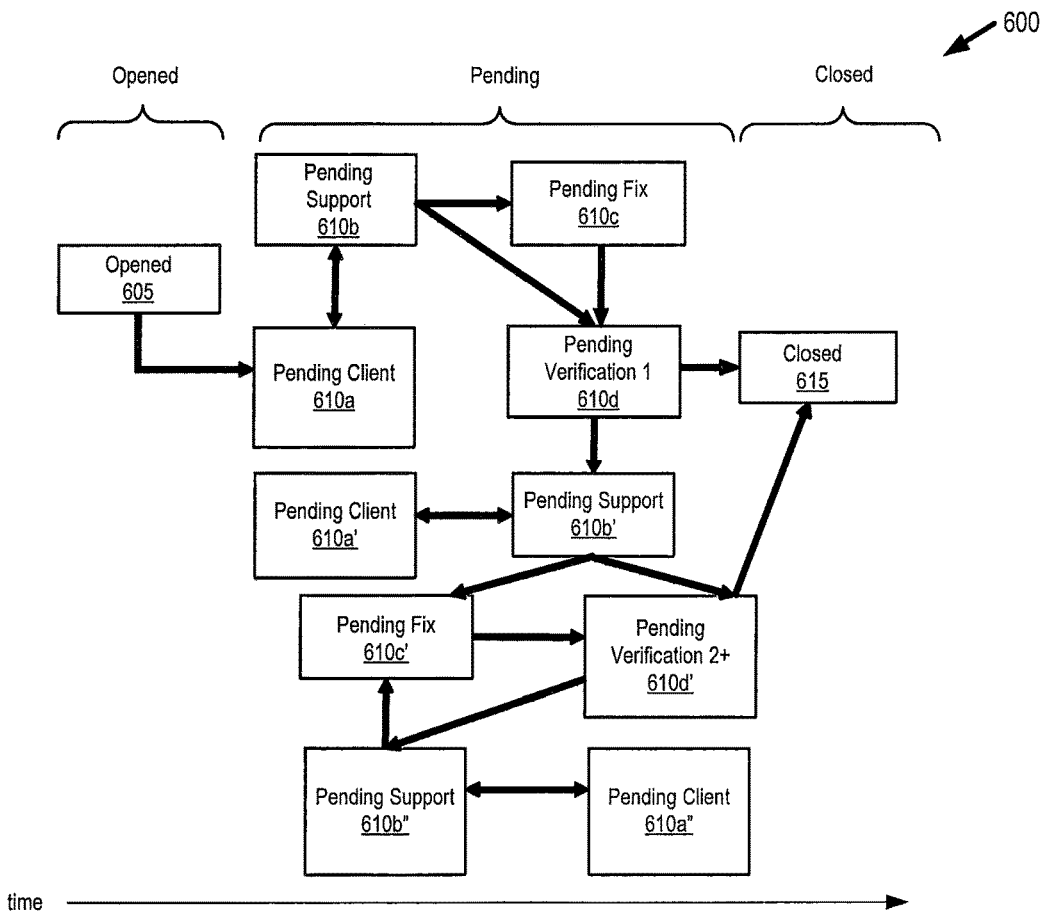

FIGS. 5 and 6 illustrate Timed Probabilistic State Graphs (TPSG), which are directed graphs defined by a set of connected states (or nodes) such that there is a probability function P that models the time spent in every state and transition. That is, the probability $p(M_t=T/M_s=S)$ is the probability of being at state T at some future time t, based on an initial state S. Although described herein with reference to a particular or fixed future time t in some embodiments, it will be understood that the probabilities described herein may similarly be computed with respect to the current time s plus an amount of time t, that is, $p(M_{s+t}=T/M_s=S)$. TPSGs can be defined manually, or can be defined automatically using techniques such as process mining. Process mining may be used to predict time-to-completion of ongoing processes, and Continuous-time Hidden Models may be used for solving the classification problem (e.g., escalated or non-escalated). Both techniques build a timed graph model. The state data that is indicative of or can otherwise be used to derive a TPSG representative of changes in the states of ticket elements based on a particular evolving attribute can thus be stored in a database, such as the database 235 of FIG. 2, for use in escalation prediction as described herein.

Referring now to FIG. 5, possible states of a particular property or attribute of a ticket element are represented in the states 505, 510a-510d, 515 of the state graph 500, and valid changes or transitions between states 505, 510a-510d, 515 are represented by directed arrows. The example TPSG 500 of FIG. 5 represents the evolution of an attribute of a ticket element, as indicated for example by the status field 201a of FIG. 2, based on the status definitions used by the issue tracking system or client support engineer in generating the ticket element. That is, 'ticket status' is the evolving/time-dependent attribute represented by the TPSG of FIG. 5.

As shown in FIG. 5, after opening the ticket element (state 505), the issue tracking system waits (state 510a) for the client to provide initial information (such as a log or screenshot) relevant to the issue that is the subject of the ticket element. While pending, work (including additional conversations or communications with the client) is performed by the support engineers (state 510b) until a fix is proposed or the issue is otherwise solved (state 510c). In the example of FIG. 5, a mandatory verification by the client (state 510d) is required in order to close the ticket (state 515). If the issue is not solved (state 510c), or if the verification fails (state 510d), the ticket element remains pending (state 510b) in the system.

FIG. 6 is a TPSG 600 further illustrating the evolution of the status of a ticket, as indicated for example by the status field 201a of FIG. 2, in greater detail. In particular, in FIG.

6, the pending verification state 610*d* of the ticket status attribute includes multiple sub-states 610*a'*-610*d'*, 610*a"*, 610*b"* depending on the number of client verifications, with transitions between the states 605, 610*a*-610*d*, 615 and the multiple sub-states 610*a'*-610*d'*, 610*a"*, 610*b"* of state 610*d* being represented by directed arrows. In particular, if while pending verification by the client (state 610*d*) it is determined that additional client verification(s) are required, additional work is performed by the support engineers (state 610*b'*), including waiting for additional information from the client (state 610*a'*), until a fix is determined (state 610*c'*) or until additional verification(s) by the client (state 610*d'*) is performed. The additional pending verification(s) (state 610*d'*) may likewise involve further work by the support engineers (state 610*b"*), including waiting for further information from the client (state 610*a"*). Ticket elements having attributes with current states corresponding to one or more of the sub-states 610*a'*-610*d'*, 610*a"*, 610*b"* of state 610*d* may have a higher probability of escalation (for example, due to being pending for a longer period of time in the system, due to multiple failed fix/verification attempts, etc.).

A TPSG defined by stored attribute-specific state data, in combination with a predictor trained based on previous ticket elements in the situation defined by each of the states of the TPSG, can be used to determine the probability of escalation of the ticket element at each of the states of the TPSG. In particular, the TPSG (or other state graph or state diagram) can be used as a mechanism to choose the predictor that best fits the current status of the ticket element. A different predictor model or method can be used for each state, or the same predictor model or method (trained with a different set of tickets) can be used for each state. Also, in some embodiments, a particular state of a state graph may be associated with another state graph corresponding to a different evolving/time-dependent attribute. For example, the pending verification state 610*d* of FIG. 6, if identified as corresponding to a state of the 'ticket status' attribute of a ticket element, may itself be indicative of a time-dependent attribute (e.g., verification), having its own state graph (including sub-states 610*a'*-610*d'*, 610*a"*, 610*b"*). In this sense, embodiments described herein may further embed or nest other TPSGs and thus consider different evolving attributes at the same time to compute escalation predictions, as also described below with reference to the example of FIG. 7.

Figure 4:
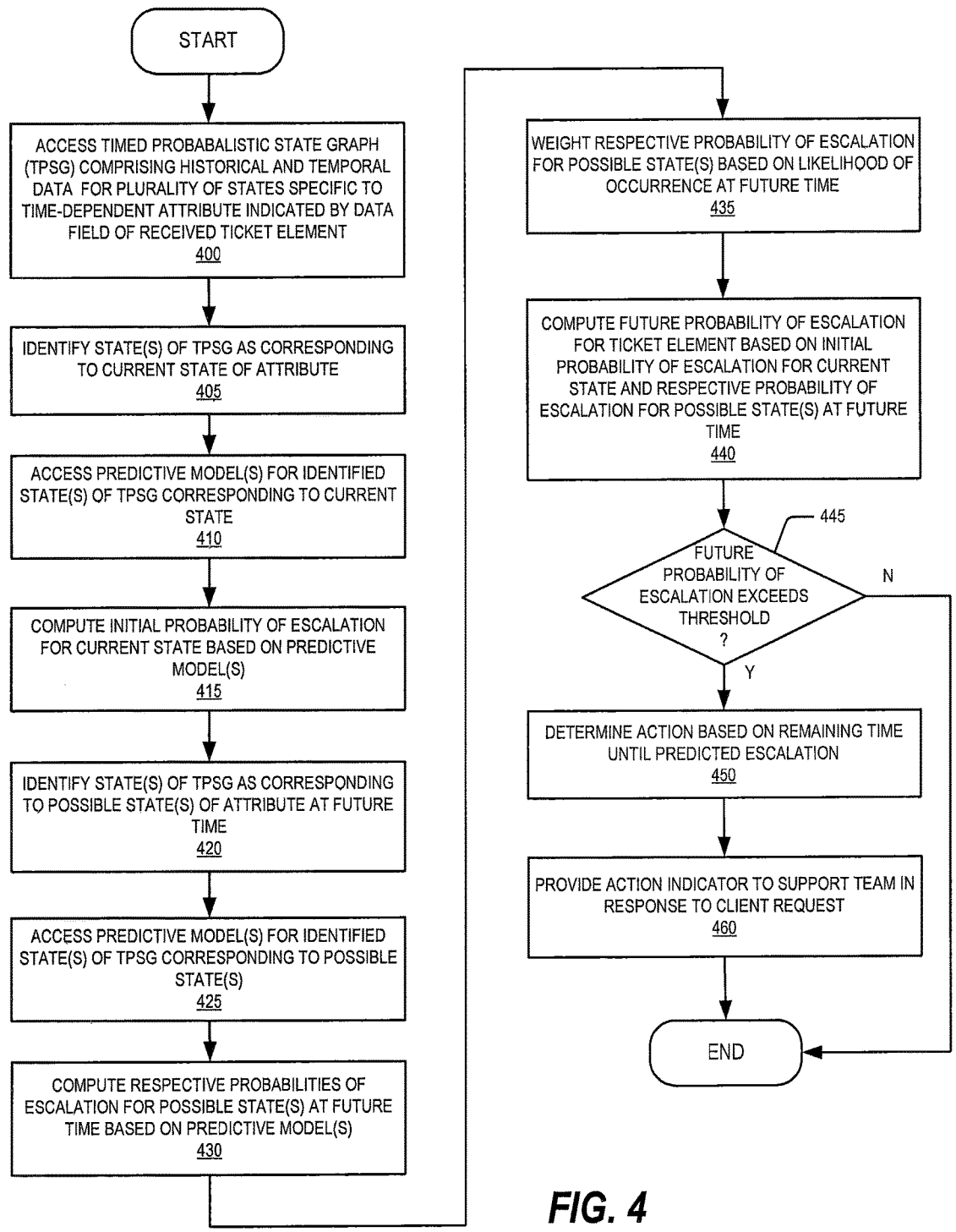

FIG. 4 is a flowchart illustrating operations for computing the probability or likelihood of receiving an escalation of a ticket element at a future time in accordance with some embodiments described herein. The operations of FIG. 4 may be performed by a processor of a computer server, such as the issue tracking server 120 and/or the prediction server 125 of FIG. 1. Referring now to FIG. 4, after receiving a ticket element, a database including a timed probabilistic state graph (TPSG) defined by state data that is specific to a time-dependent attribute indicated by a data field of the ticket element is accessed at block 400. The TPSG may be defined by historical data indicating timed state changes with respect to previous ticket elements generated by the issue tracking system and/or other systems, and may represent a plurality of states associated with the time-dependent attribute.

At block 405, one or more of the states of the TPSG are identified as corresponding to a current state S of the time-dependent attribute of the ticket element. In some instances, approximate (rather than exact) mechanisms may be used to identify the state(s) of the TPSG that more closely or best fit the current state S of the time-dependent attribute of the received ticket element, as the states of the TPSG may not exactly match those of the ticket element. One or more predictive models that are specific to the identified state(s) of the TPSG corresponding to the current state S are accessed at block 410 and applied as state-specific predictor(s) to compute an initial probability of escalation for the current state S of the time-dependent attribute at block 415.

At block 420, one or more of the states of the TPSG are likewise identified as corresponding to one or more possible states T of the time-dependent attribute at a future time t, based on the current state S of the time-dependent attribute at the current time s and the timed state changes indicated in the TPSG. Approximate (rather than exact) mechanisms may similarly be used to identify the state(s) of the TPSG that more closely or best fit the possible future state(s) T of the time-dependent attribute. At block 425, one or more predictive models that are specific to the identified state(s) of the TPSG corresponding to the possible state(s) T are accessed, and the predictive model(s) are applied as state-specific predictor(s) to compute respective probabilities of escalation for the possible state(s) T at the future time t at block 430, approximating the prediction in future steps of the ticket resolution.

The respective probabilities of escalation for the possible state(s) T are weighted based on the likelihood(s) of occurrence thereof at the future time t at block 435. For example, in addition to indicating timed state changes, the state data stored in the database may be indicative of or otherwise used to determine likelihoods of occurrence for each of the states included therein. At block 440, a probability of escalation for the ticket element at the future time t is computed by leveraging the initial probability of escalation for the current state (computed at block 415) and the weighted respective probabilities of escalation for the possible states at the future time t (computed at block 435), for example, by averaging the values computed at blocks 415 and 435.

The computed probability of escalation with respect to the future time t is compared to an escalation threshold at block 445. If the threshold is exceeded, at least one course of action is determined based on the remaining time until the predicted escalation (that is, based on the amount of time remaining between the current time s and the future time t) at block 450. For example, depending on the probability of escalation relative to the threshold and the amount of time remaining, an alarm may be raised to alert the support team of the probability of escalation of the ticket element in advance of the future time t. Additionally or alternatively, the ticket element may be proactively escalated, before receiving a client request for escalation, based on probability of escalation relative to the threshold and the amount of time remaining. At least one action indicator is thereby generated and provided to the client support team in response to the client request at block 460.

The action indicator(s) generated at block 46Q may further provide automated actions that can be taken to address the issue indicated in the ticket element. For example, the action indicator may identify a software update that may aid in resolution of the issue, and thus, a user-selectable link indicating an online address for downloading the software update may be transmitted through a network interface toward the client device 101, for example, via e-mail or text message. Additionally, the action indicator may identify a troubleshooting knowledge base (e.g., a web forum) entry that corresponds to the issue indicated in the ticket element, and a user-selectable link indicating an online address of the entry may be transmitted through a network interface toward the client device 101.

Operations of FIG. 4 are described in greater detail below. For example, identifying the state(s) of the TPSG that most closely match the current state S of the ticket element at block 405 is based on the evolving attribute of the ticket element that is selected to generate or otherwise access the TPSG, the possible state(s) of this evolving attribute, and the mechanisms available to identify the state(s) from a data field of a given ticket element. The predictive model(s) associated with the identified state(s) is selected at block 410, and is applied as a predictor to compute a first or initial estimation of the likelihood or probability of a client escalation at block 415. The evolution of this initial estimation is computed at block 440.

In the example TPSG 500 of FIG. 5, based on an attribute indicated by a data field of a ticket element, one or more of the states 505, 510a-510d, 515 that exactly, most closely, or similarly fits the current ticket life-status (Opened, Closed, Pending Fix, etc.) is identified as the current state S at block 405, and a predictive model corresponding to the identified current state is selected and accessed at block 410. The TPSG 600 of FIG. 6 illustrates a more complex example based on the same evolving attribute; however, in identifying one or more of the states 605, 610a-610d, 615 that exactly, most closely, or similarly fit the current ticket life-status, the number of times the ticket element has been in a particular life-status is also considered (e.g., state 610d' 'Pending Fix 2+' is considered if the ticket element has been previously in state 610c 'Pending Fix'). In a more complex TPSG such as the one depicted in FIG. 6, a partial or entire evolution of the ticket element (up to its current status) may be taken into account. In some embodiments, methods such as edit distance and/or trace alignment can also be used to identify the closest-matching state(s) in the TPSG as corresponding to a state of an attribute indicated by a data field of a ticket element.

The operations of FIG. 4 can also consider several states for the prediction. This may be particularly useful in embodiments where the TPSG is computed or otherwise derived using process mining techniques, as it may not always be possible to find the exact state but a set of probable states. For example, at block 415, an initial prediction or probability of escalation can be computed for each of the probable states of the TPSG identified as corresponding to the current state S of the time-dependent attribute, and these multiple initial probabilities of escalation can be averaged at block 440 (in addition to the respective probabilities of escalation for the possible future states T) in computing the future probability of escalation of the ticket element. In some embodiments, the set of probable states of the TPSG that are identified as corresponding to the current state S may also be weighted, for example, based on the calculated edit distances.

Still referring to the operations of FIG. 4, given a ticket element, the state(s) identified as closest matching with respect to the current state S of the time-dependent attribute at time s, and a predefined period of time t after time s, embodiments described herein can predict an expected likelihood or probability of receiving an escalation of the ticket element in the next t units of time. In particular, as identified at block 420, two changes can occur with respect to the time-dependent attribute of the ticket element during the period of time t: the current state S may not change (that is, the current state S may be maintained over the time t), with probability defined as $p(M_{s+t}=S/M_s=S)$; or, the current state S may transition to future state T, with probability defined as $p(M_{s+t}=T/M_s=S)$. The future probability of escalation can be computed at block 440 by considering both cases independently, and averaging the resulting predicted likelihood, i.e., by considering all states T such that $p(M_{s+t'}=T/M_s=S)$ for $t'<t$ is not zero:

$$\text{Likelihood}(S, s, t) = \sum_{T \text{ s.t. } p(M_{s+t}=T/M_s=S) \neq 0} p(M_{s+t} = T/M_s = S) \times \text{Prediction}_T(s, t),$$

where $\text{Prediction}_T$ is the prediction associated to each possible future state T. The predictor(s) applied at block 430 can use the time t as an input for the prediction.

In addition, contextual information (which is not indicated by or otherwise evident from the data fields of the ticket element) may also be used in computing the future probability of escalation. For example, the number of issues for which ticket elements have been opened concurrently by the same client may be an indicator of the level of (dis)satisfaction of the client with a product or service. This number of opened or currently-pending ticket elements may be used as an input to the selected predictor associated with the state or context in determining the future probability of escalation of a ticket element opened by that particular client. Also, as discussed above, a TPSG based on a different evolving attribute may be used to select the predictor associated with a state, in order to model multiple evolving attributes. An example of the above may be a TPSG defined by the set of states representing the number of tickets opened concurrently by the same client. Time in a state may indicate the mean time needed to close (at least) one ticket, and timed transitions may measure the time in which the client had another issue before solving a previous issue. The operations of FIG. 4 may be used as a predictor of each state of this new TPSG.

Figure 7:
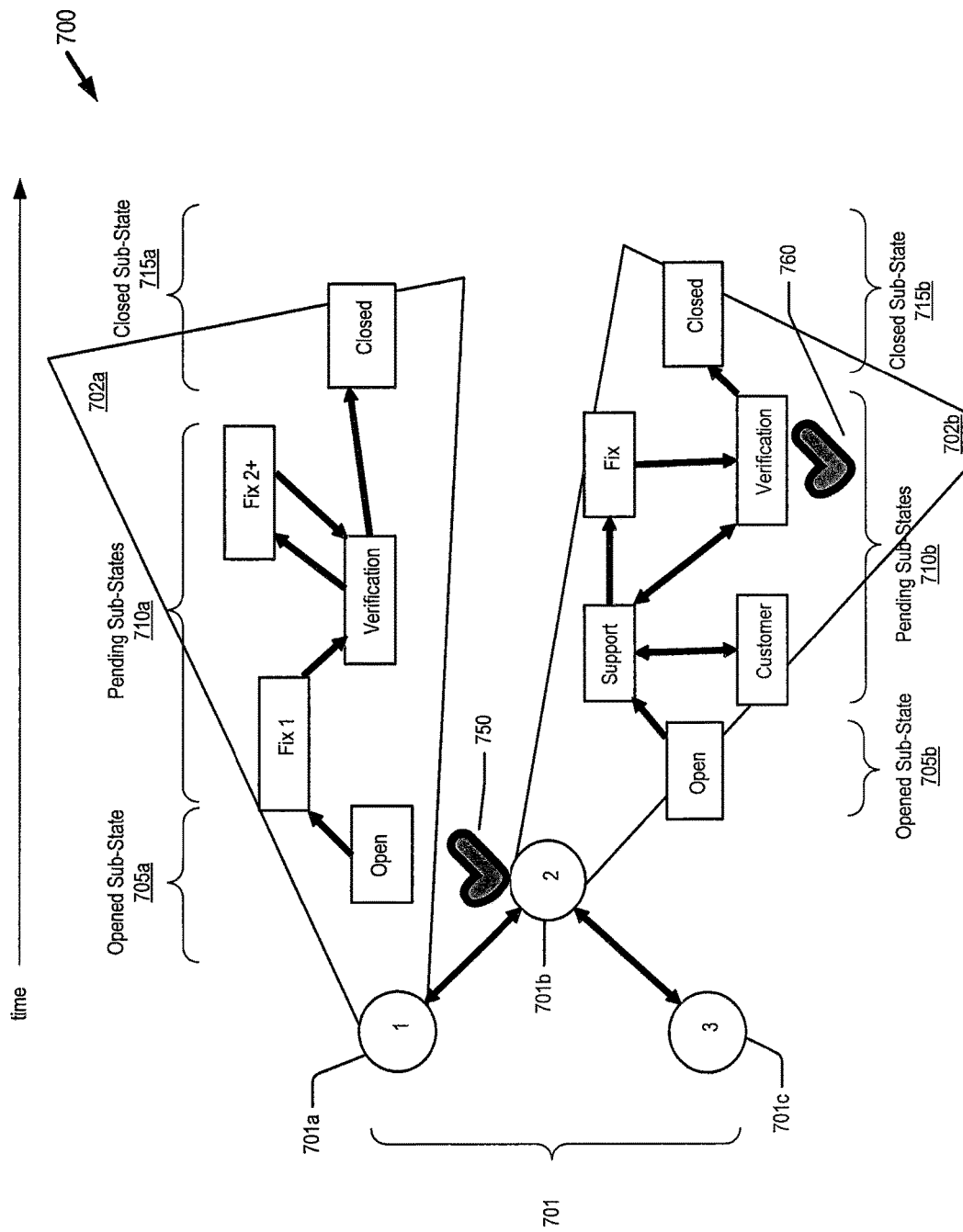

FIG. 7 depicts an example of a multiple-TPSG scenario 700 according to some embodiments described herein. The first main or overall TPSG 701 (including states 701a, 701b, 701c) is specific to a contextual attribute indicating the number of ticket elements currently opened by a particular client (in FIG. 7, the client has 2 opened ticket elements). Then, for each of states 701a and 701b, an associated (or "nested") sub-TPSG (highlighted by triangles 702a and 702b, respectively), models changes in the status of the ticket element. In particular, sub-TPSG 702a includes opened sub-state 705a, pending sub-states 710a, and closed sub-state 715a, while sub-TPSG 702b includes opened sub-state 705b, pending sub-states 710b, and closed sub-state 715b. Transitions between these sub-states (indicated by directed arrows) are similar to those described above with reference to the TPSGs of FIGS. 5 and 6. It will also be understood that the subs-states of the associated TPSGs 702a and 702b may differ depending on the number of tickets. In the example of FIG. 7, computation of the probability of escalation of a ticket element attribute corresponding to the verification sub-state (indicated by "check" 760) of a client with 2 opened ticket elements (indicated by "check" 750) is illustrated, and thus, the status of any non-processed ticket elements 701c are not taken into account in this example.

Figure 8:
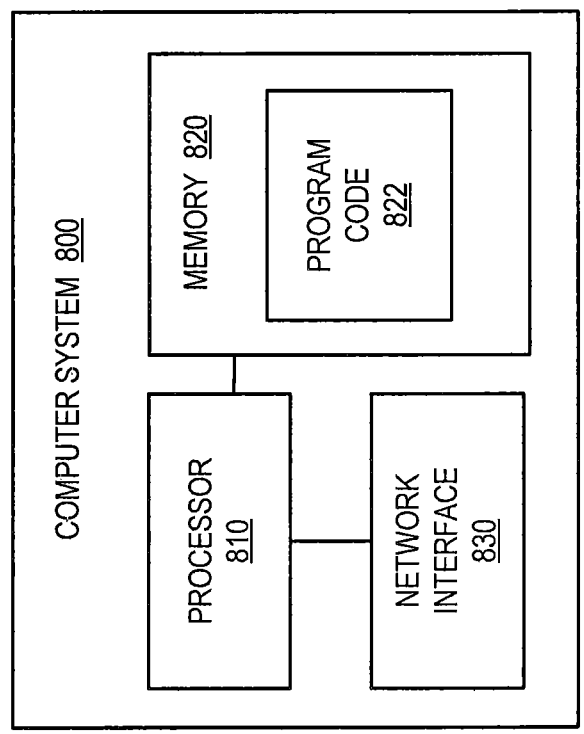
FIG. 8 is a block diagram of a computer system that may be incorporated into various components of the computer system of FIG. 1 in accordance with some embodiments.

FIG. 8 is a block diagram of a computer system 800 that may be used as an issue tracking server 120, prediction server 125, and/or other computer hardware to perform the operations of one of more of the embodiments disclosed herein for one or more of those elements. The computer system 800 can include one or more network interface circuits 830, one or more processor circuits 810 (referred to as "a processor" for brevity), and one or more memory circuits 820 (referred to as "a memory" for brevity) containing computer-readable program code 822.

The processor 810 may include one or more data processing circuits, such as a general purpose and/or special purpose processor (e.g., microprocessor and/or digital signal processor) that may be collocated or distributed across one or more networks. The processor 810 is configured to execute program code 822 in the memory 820, described herein as a computer readable storage medium, to perform some or all of the operations for one or more of the embodiments disclosed herein.

In some embodiments, the network interface 830 provides communication capability with other computer systems on a same local network, on a different network connected via modems and the like to the present network, or to other computers across the Internet. In various embodiments of the present invention, the network interface 830 can be implemented utilizing technologies including, but not limited to, Ethernet, Fast Ethernet, Gigabit Ethernet, wide-area network (WAN), etc. Additionally or alternatively, the network interface 830 may include one or more radio transceivers configured to communicate with wireless devices using one or more radio access technologies. The radio access technologies may include, but are not limited to, Near Field Communication (NFC), Bluetooth, WLAN, 3GPP Long Term Evolution (LTE), etc.

The computer system 800 described herein may thus be provisioned with or may be otherwise configured to access one or more databases storing state graphs and/or predictive models to enable the device to calculate current and future probabilities of escalation with respect to a ticket element generated in response to a client request for resolution of an issue with a product or service, as described herein.

In some embodiments, the future probability of escalation may correspond to a future time. The future state may be identified from temporal data indicating respective durations of or between the plurality of states with respect to the future time.

In some embodiments, the future probability of escalation may be calculated based on a predictive model for the future state at the future time.

In some embodiments, the future probability of escalation may be weighted based on a likelihood of occurrence of or transition to the future state at the future time, based on the current state at the current time.

In some embodiments, the future state may include a plurality of possible states at the future time, where one of the possible states at the future time may be the current state. The future probability of escalation may be based on a combination of respective probabilities of escalation for each of the possible states at the future time, and the respective probabilities of escalation may be weighted based on respective likelihoods of occurrence of the possible states at the future time.

In some embodiments, the future probability of escalation may be further based on a current probability of escalation calculated based on a predictive model for the current state at the current time.

In some embodiments, the action indicator(s) may be further based on a remaining amount of time until occurrence of the escalation.

In some embodiments, the computed probabilities may represent multi-level escalation, for example, from support team member to supervisor (i.e., Level 1) and then supervisor to manager (i.e., Level 2). Such levels of escalation may be indicated by or otherwise determined from the historical data (e.g., from previous ticket elements) stored in the knowledge database, and an additional computation may be performed to calculate a likelihood of such different levels of escalation for one or more of the future states. That is, the probabilities of multi-level escalation may be computed in accordance with embodiments described herein by first predicting the escalation from the support team member to the supervisor in accordance with embodiments described herein, and then predicting the escalation from the supervisor to the manager in accordance with embodiments described herein.

More generally, embodiments described herein may determine additional types of escalations (or other possible outcomes from one or more data fields of a ticket element) by adding or otherwise accessing more Predictors for each state in the TPSG.

For instance, formula 240 of FIG. 2 can be used to compute the likelihood of a ticket being escalated because Predictor(s,t) is a predictor specifically created (based for example on historical data) to detect escalations. As such, the database 235b may further include Predictors created or specific to respective types or levels of escalation, and respective formulas 240 may be used to compute corresponding likelihoods of escalation individually, for each type or level. As an example:

$$\text{Likelihood(Member}\rightarrow\text{Supervisor)}=\Sigma p(Ms+t=T/Ms=)\times\text{Predictor}_{Member\rightarrow Supervisor}(s,t)$$

$$\text{Likelihood(Member}\rightarrow\text{Manager)}\Sigma p(Ms+t=T/Ms=S)\times\text{Predictor}_{Member\rightarrow Manager}(s,t)$$

Note that the calculation of p(Ms+t=T/Ms=S) may be the same for the new set of formulas, and may be given by the relationships between states indicated by the TPSG, but may differ in the Predictor used in each case.

In some embodiments, the future probability of escalation and/or the action indicator may be based on additional contextual attributes that are not indicated in the data structure of the ticket element, including, for example, the technical level of skill of the client and/or the criticality of the system or data. For example, relatively inexperienced clients may be more likely to complain, and thus, the level of skill or experience of the client may be used as contextual attribute in computation of the probability of escalation. In addition, criticality of the system or data may be indicated by or otherwise evident from the type of data (images, e-mails, texts, webpages) being processed by the client, the level of confidentiality of the data, and/or the size of the data. Criticality may also be indicated by one or more data fields of the ticket element. For example, in FIG. 2, the severity field 201b may indicate several levels (e.g., Severity Level 1=issue is causing monetary loss; Severity Level 2=issue will affect business if not resolved quickly; Severity Level 3=general complaints and/or implementation questions; Severity Level 4=general questions). In some embodiments, such contextual attributes may be gathered manually by support engineers based on previous experiences with the client (e.g., client's technical level), and/or by direct questioning of the client (e.g., criticality of the issue) and added to the ticket element and/or knowledge database. Further embodiments may use natural language processing with previously-resolved tickets; for example, more experienced clients may be identified from the use of more technical words in describing an issue in the previous tickets, while inexperienced clients may be identified from the use of more buzzwords and/or vague terms. The presence of words indicating severity (e.g., ASAP) may be similarly be identified as highlighting the urgency/criticality of an issue.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the embodiments described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. For example, it will be understood that "a processor" may refer to one or more processors when used herein. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A computer server, comprising:
    a processor; and
    a memory coupled to the processor, the memory comprising a computer-readable storage medium storing computer-readable program code therein that is executable by the processor to perform:
    receiving a ticket element generated by an issue tracking system responsive to a client request, the ticket element comprising a data field for a time-dependent attribute, wherein the data field comprises data therein indicative of a current state of the time-dependent attribute for the ticket element;
    accessing a database comprising state data stored therein responsive to the data field for the time-dependent attribute, wherein the state data relates a plurality of states that are specific to the time-dependent attribute and comprises temporal data indicating respective durations of or between the plurality of states that are specific to the time-dependent attribute for the ticket element;
    identifying one of the plurality of states related by the state data as corresponding to a future state of the time-dependent attribute for the ticket element based on the current state of the time-dependent attribute for the ticket element, wherein identifying the one of the plurality of states related by the state data as corresponding to the future state of the time-dependent attribute for the ticket element is based on the respective durations indicated by the temporal data with respect to a future time that corresponds to the future state of the time-dependent attribute for the ticket element after a current time that corresponds to the current state of the time-dependent attribute for the ticket element;
    computing a future probability of escalation of the ticket element based on the future state of the time-dependent attribute for the ticket element responsive to identification of the one of the plurality of states as corresponding thereto based on the respective durations of or between the plurality of states; and
    providing an action indicator in response to the client request based on the future probability of escalation of the ticket element relative to a predefined threshold.

2. The computer server of claim 1, the computer-readable storage medium further storing computer-readable program code therein that is executable by the processor to perform:
    accessing a database comprising a predictive model for the one of the plurality of states responsive to the identification thereof, wherein the predictive model comprises historical escalation data specific to the one of the plurality of states, wherein computing the future probability of escalation is based on the predictive model for the one of the plurality of states responsive to the identification thereof as corresponding to the future state of the time-dependent attribute for the ticket element.

3. The computer server of claim 1, the computer-readable storage medium further storing computer-readable program code therein that is executable by the processor to perform:
    determining, based on the Current state of the time-dependent attribute for the ticket element at the current time, a likelihood of occurrence of the future state of the time-dependent attribute for the ticket element at the future time responsive to the identification of the one of the plurality of states related by the state data as corresponding thereto, wherein the future probability of escalation is weighted based on the likelihood of occurrence of the future state of the time-dependent attribute for the ticket element at the future time.

4. The computer server of claim 3, wherein the identifying comprises:
    identifying a subset comprising ones of the plurality of states related by the state data as corresponding to possible states of the time-dependent attribute for the ticket element at the future time, respectively, and wherein computing the future probability of escalation comprises: computing respective probabilities of escalation for the possible states of the time-dependent attribute for the ticket element, wherein the respective probabilities of escalation are weighted based on respective likelihoods of occurrence of the possible states at the future time, and combining the respective probabilities of escalation.

5. The computer server of claim 4, wherein one of the possible states of the time-dependent attribute for the ticket element at the future time comprises the current state.

6. The computer server of claim 1, the computer-readable storage medium further storing computer-readable program code therein that is executable by the Processor to perform:

identifying another of the plurality of states related by the state data as corresponding to the current state of the time-dependent attribute for the ticket element; and computing an initial probability of escalation for the current state of the time-dependent attribute for the ticket element based on a predictive model for the another of the plurality of states responsive to the identification thereof, wherein computing the future probability of escalation is further based on the initial probability of escalation for the current state of the time-dependent attribute for the ticket element.

7. The computer server of claim 1, wherein providing the action indicator comprises:
determining the action indicator based on the future probability of escalation relative to the predefined threshold and based on a remaining amount of time between the current time and the future time.

8. The computer server of claim 1, wherein computing the future probability of escalation is further based on a contextual attribute that is not indicated by a data structure of the ticket element, wherein the contextual attribute comprises at least one of a number of ticket elements currently associated with a client for the ticket element, and/or a technical skill level of the client for the ticket element.

9. The computer server of claim 1, wherein the one of the plurality of states comprises sub-state data associated therewith, the sub-state data relating a plurality of sub-states for the one of the plurality of states, and wherein computing the future probability of escalation comprises computing respective probabilities of escalation for the sub-states, and combining the respective probabilities of escalation for the sub-states.

10. The computer server of claim 1, wherein the plurality of states that are specific to the time-dependent attribute comprise at least two of an opened state, a pending support state, a pending fix state, a pending client state, a pending verification state, and/or a closed state, and wherein the temporal data indicates durations between the plurality of states including the at least two of an opened state, a pending support state, a pending fix state, a pending client state, a pending verification state, and/or a closed state.

11. The computer server of claim 10, wherein the current state of the time-dependent attribute for the ticket element comprises a first state selected from the opened state, the pending support state, the pending fix state, the pending client state, the pending verification state, and/or the closed state, wherein the future state of the time-dependent attribute for the ticket element comprises a second state selected from the opened state, the pending support state, the pending fix state, the pending client state, the pending verification state, and/or the closed state, and wherein the first and second states are different.

12. A method, comprising:
performing, by a processor of a computer server:
receiving a ticket element generated by an issue tracking system responsive to a client request, the ticket element comprising a data field for a time-dependent attribute, wherein the data field comprises data therein indicative of a current state of the time-dependent attribute for the ticket element;
accessing a database comprising state data stored therein responsive to the data field for the time-dependent attribute, wherein the state data relates a plurality of states that are specific to the time-dependent attribute indicated by the data in the data field for the time-dependent attribute of the ticket element, and wherein the state data relates a plurality of states that are specific to the time-dependent attribute and the state data comprises temporal data indicating respective durations of or between the plurality of states that are specific to the time-dependent attribute for the ticket element;
identifying one of the plurality of states related by the state data as corresponding to a future state of the time-dependent attribute for the ticket element based on the current state of the time-dependent attribute of the ticket element, wherein identifying the one of the plurality of states related by the state data as corresponding to the future state of the time-dependent attribute for the ticket element is based on the respective durations indicated by the temporal data with respect to a future time that corresponds to the future state of the time-dependent attribute for the ticket element after a current time that corresponds to the current state of the time-dependent attribute for the ticket element;
computing a probability of escalation of the ticket element with respect to the future time based on the current state and the future state of the time-dependent attribute for the ticket element responsive to identification of the one of the plurality of states as corresponding thereto based on the respective durations of or between the plurality of states; and
providing an action indicator in response to the client request based on the probability of escalation of the ticket element with respect to the future time relative to a predefined threshold.

13. The method of claim 12, further comprising:
accessing a database comprising respective predictive models for the ones of the plurality of states responsive to the identification thereof, wherein the respective predictive models comprise historical data specific to the ones of the plurality of states and respective durations of time associated therewith, wherein computing the probability of escalation with respect to the future time is based on the predictive models for the ones of the plurality of states.

14. The method of claim 12, further comprising:
determining, based on the current state of the time-dependent attribute for the ticket element at the current time, a likelihood of occurrence of the future state of the attribute for the ticket element at the future time responsive to the identification, wherein the probability of escalation with respect to the future time is weighted based on the likelihood of occurrence of the future state of the time-dependent attribute for the ticket element at the future time.

15. The method of claim 14, wherein the identifying comprises:
identifying a subset comprising ones of the plurality of states related by the state data as corresponding to possible states of the time-dependent attribute for the ticket element at the future time, respectively, and wherein computing the probability of escalation with respect to the future time comprises:
computing respective probabilities of escalation for the possible states of the time-dependent attribute for the ticket element, wherein the respective probabilities of escalation are weighted based on respective likelihoods of occurrence of the possible states at the future time, and combining the respective probabilities of escalation.

16. The method of claim 15, wherein one of the possible states of the time-dependent attribute for the ticket element at the future time comprises the current state.

17. The method of claim 14, wherein computing the probability of escalation with respect to the future time further comprises:
  computing a first probability of escalation for the current state of the time-dependent attribute for the ticket element based on a first one of the respective predictive models;
  computing a second probability of escalation for the future state of the time-dependent attribute for the ticket element based on a second one of the respective predictive models, wherein the second probability of escalation is weighted based on the likelihood of occurrence of the future state at the future time;
  and combining the first and second probabilities of escalation.

18. The method of claim 12, wherein providing the action indicator comprises:
  determining the action indicator based on the probability of escalation with respect to the future time relative to the predefined threshold and based on a remaining amount of time between the current time and the future time.

19. The method of claim 12, wherein computing the probability of escalation with respect to the future time is further based on a contextual attribute that is not indicated by a data structure of the ticket element.

20. A computer program product, comprising:
  a non-transitory computer-readable storage medium comprising computer-readable program code embodied therein that is executable by a processor of a computer server to perform:
  receiving a ticket element generated by an issue tracking system responsive to a client request, the ticket element comprising a data field for a time-dependent attribute, wherein the data field comprises data therein indicative of a current state of the time-dependent attribute for the ticket element;
  accessing a database comprising state data stored therein responsive to the data field for the time-dependent attribute, wherein the state data relates a plurality of states that are specific to the time-dependent attribute and comprises temporal data indicating respective durations or or between the plurality of states that are specific to the time-dependent attribute for the ticket element;
  identifying one of the plurality of states related by the state data as corresponding to a future state of the time-dependent attribute for the ticket element based on the current state of the time-dependent attribute for the ticket element, wherein identifying the one of the plurality of states related by the state data as corresponding to the future state of the time-dependent attribute for the ticket element is based on the respective durations indicated by the temporal data with respect to a future time after a current time that corresponds to the current state of the time-dependent attribute for the ticket element;
  computing a future probability of escalation of the ticket element based on the future state of the time-dependent attribute for the ticket element responsive to identification of the one of the plurality of states as corresponding thereto based on the respective durations of or between the plurality of states; and
  providing an action indicator in response to the client request based on the future probability of escalation of the ticket element relative to a predefined threshold.

* * * * *